(12) United States Patent
Manion et al.

(10) Patent No.: US 8,756,683 B2
(45) Date of Patent: Jun. 17, 2014

(54) DISTRIBUTED MALICIOUS SOFTWARE PROTECTION IN FILE SHARING ENVIRONMENTS

(75) Inventors: Todd Manion, Bellevue, WA (US); Ryan Kim, Sammamish, WA (US); Sandeep K. Singhal, Kirkland, WA (US); Guhan Suriyanarayanan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1470 days.

(21) Appl. No.: 11/638,034

(22) Filed: Dec. 13, 2006

(65) Prior Publication Data

US 2008/0148403 A1 Jun. 19, 2008

(51) Int. Cl.
| G06F 11/00 | (2006.01) |
| G06F 12/14 | (2006.01) |
| G06F 7/04  | (2006.01) |
| G06F 17/30 | (2006.01) |

(52) U.S. Cl.
USPC ............... 726/22; 726/23; 726/24; 726/25; 726/26

(58) Field of Classification Search
None
See application file for complete search history.

(56) References Cited

U.S. PATENT DOCUMENTS

| 6,415,280 | B1 * | 7/2002 | Farber et al. ............... 707/698 |
| 7,080,407 | B1   | 7/2006 | Zhao et al. |
| 7,086,090 | B1 * | 8/2006 | Dawson et al. ............. 726/24 |
| 7,325,251 | B1 * | 1/2008 | Szor ............................ 726/22 |
| 7,529,187 | B1 * | 5/2009 | Hernacki et al. .......... 370/230 |
| 7,594,275 | B2 * | 9/2009 | Zhu et al. ................... 726/26 |
| 7,925,897 | B2 * | 4/2011 | Nair ............................ 713/194 |
| 8,001,603 | B1 * | 8/2011 | Kennedy ..................... 726/24 |
| 2002/0147915 | A1 * | 10/2002 | Chefalas et al. .......... 713/188 |
| 2003/0023866 | A1 | 1/2003 | Hinchliffe et al. |
| 2004/0133629 | A1 * | 7/2004 | Reynolds et al. ........... 709/202 |
| 2004/0158741 | A1 | 8/2004 | Schneider |
| 2004/0260761 | A1 * | 12/2004 | Leaute et al. ............... 709/201 |
| 2005/0144288 | A1 | 6/2005 | Liao |
| 2005/0160355 | A1 * | 7/2005 | Cragun et al. .............. 715/512 |
| 2005/0216559 | A1 | 9/2005 | Manion et al. |
| 2006/0075083 | A1 | 4/2006 | Liu |
| 2006/0075504 | A1 | 4/2006 | Liu |
| 2006/0185015 | A1 | 8/2006 | Cheston et al. |
| 2006/0206486 | A1 | 9/2006 | Strickland |

OTHER PUBLICATIONS

"D-Link Partners With McAfee to Provide Industry-Leading Virus Protection With SECURESPOT (TM) Internet Security Device", Date: Nov. 20, 2006, http://biz.yahoo.com/prnews/061120/lam008.html?.v=66.

"Peer-to-Peer Protection: Advanced Protection and Control for Real-Time Collaboration", Date: May 2004, pp. 2, http://whitepapers.techrepublic.com.com/whitepaper.aspx?docid=147276.

Chien Eric, "Malicious Threats of Peer-to-Peer Networking", Date: Jun. 2003, http://www.symantec.com/avcenter/reference/malicious.threats.pdf.

"Bullguard", retrieved at: http://www.bullguard.com/antivirus/antivirus.aspx, retrieved on Dec. 12, 2006, 2 pages.

* cited by examiner

*Primary Examiner* — Cordelia Zecher
*Assistant Examiner* — Trang Doan
(74) *Attorney, Agent, or Firm* — Jim Ross; Leonard Smith; Micky Minhas

(57) ABSTRACT

Automatic file replication and scanning for malware in a sharing environment is based on detection of file system changes. Only one client of the multi-client environment needs to include malware protection software for all clients to benefit. A file replication service for each client monitors a shared directory, and synchronizes files across clients at the file system driver level. When a new file appears in the shared directory of a client system, through this driver, the new file automatically gets replicated. A malware protection component operates by monitoring the directory for new or modified files. File replication causes automatic malware scanning on the client that has protection. When the file has been cleaned and re-written to the directory, the replication service senses that the file has changed and replicates the cleaned file to the other clients. Thus, the replication behavior produces a multiparty file scanning and cleansing protection scheme.

20 Claims, 10 Drawing Sheets

DISTRIBUTED MALICIOUS SOFTWARE PROTECTION IN FILE SHARING ENVIRONMENTS

BACKGROUND

The rapid evolution in hardware and software technology is making it more the norm rather than the exception that users will have multiple computing devices with which to interact with data and programs. For example, in a single-user situation, it is commonplace for the user to have a desktop computer and one or more additional computing devices such as a portable/laptop computer or a mobile device (e.g., cell phone) with which to access network services. Moreover, multiple users interacting can utilize different devices during this interaction process. For example, one user may connect using a desktop computer, a second user may connect using a portable computer, and a third user may connect using a cell phone. With so many devices, users can fail to maintain protection on each device against malicious software ("malware") that is becoming so prevalent.

During the course of file sharing among multiple participants, a situation can occur where a participant adds a file containing a virus to a common file sharing area (e.g., a directory). Thus, if each user is not sufficiently protected against the particular virus, one or more of the participating clients will become infected; the file sharing area may be automatically replicated to all interacting participants, so users may receive a local copy of the virus even if they do not explicitly download or access the infected file. This becomes problematic, because there is no convenient way of checking or actually knowing whether each participant possesses sufficient virus or malware protection—or any protection at all—short of asking each user before granting access to the shared environment. Again, the same problem can exist where the single user has several types of devices not all of which include protection against malicious software.

Virus protection software, for example, typically addresses an infected file at the driver level in the protocol stack of the standard OSI (open system interconnection) model, for example. This software, if properly installed, prevents infected files from being received from a remote location. Accordingly, more effective mechanisms should be provided in sharing environments for protecting infected information from being propagated throughout computing systems.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The disclosed architecture facilitates the automatic scanning of a document or file in a multi-client sharing environment for malicious content (e.g., a virus) based upon only one of the clients having a malicious software ("malware") protection capability. This is accomplished by providing a malware protection layer to monitor changes at the device driver layer (e.g., the file system driver level). In addition, a distributed file replication service also operates by monitoring changes to a monitored file system. More specifically, the file replication service provides a way to synchronize a file across systems at the file system driver level. When a new or changed file appears in the sharing directory of the client system, through this driver, the new or changed file automatically causes the replication process to replicate the new or changed document to the shared clients. If the client has a malware scanning program, a scanning (e.g., virus scan) and/or cleaning operation is performed (e.g., depending on the user setup) after detecting the file replication to the monitored file system. The file cleaning triggers the file replication service to replicate the file back to the other clients.

Alternatively, if the client does not include malware protection capability, the infected file is replicated to the other clients (e.g., a second client that can include malware scanning capability). The replication service of the second client detects a change in its shared directory and automatically initiates scanning of the file prior to replication at the driver level. The now cleaned file is then replicated back to the other clients, and the originally infected file is deleted. Thus, the synchronization behavior of the service produces a multi-party file scanning and cleansing protection scheme such that no more than one malware scanning application is required for the shared environment.

In a more specific peer-to-peer (P2P) implementation, a detected change in a document (or data) of one peer client can automatically invoke scanning of the document for a virus by a virus protection application ("virus scanner") of one of the other peers.

In yet another implementation, the introduction of a document into a shared environment automatically invokes scanning of the document for a virus by one of the clients of the shared environment. Once scanned, the document is then replicated to the other clients, one of which can be the client via which the document was introduced. In the same environment, if a document of the environment is changed, the change is detected and automatically causes one of the clients having a virus scanner to scan the document for a virus, after which the cleaned document is replicated to the other environment clients.

Accordingly, the architecture operates to provide distributed virus protection in a shared workspace, distributed virus protection in P2P systems, and distributed virus protection in P2P systems at the file system driver level.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
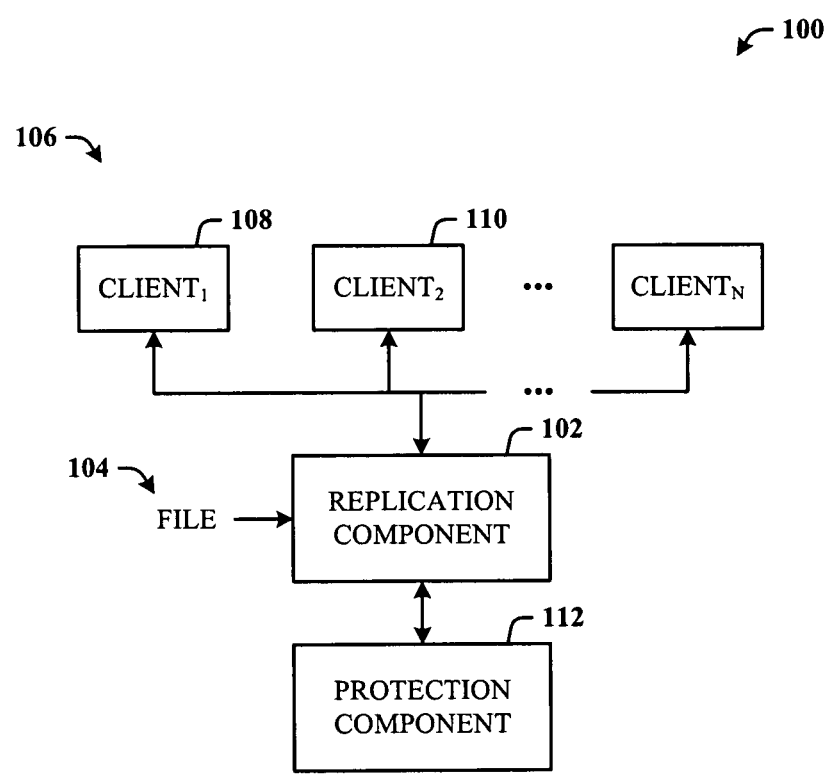
FIG. 1 illustrates a system that facilitates data management in a multi-client environment.

The innovation facilitates the automatic scanning and cleansing of a file in a multi-client environment for adverse content such as a virus. Once cleansed, the document can then be automatically replicated to the other clients. More specifically, only one client of the multi-client environment needs to have virus scanning software for the other clients to gain the benefit of the anti-virus scanning. A file replication service (FRS) of each of the clients synchronizes a file across client systems at the file system driver level, the same level on which virus protection software operates. In other words, when a new file appears in a sharing directory of one client system, through this driver, presence of the new file can automatically cause a scanning and/or cleaning operation to occur. Thus, the synchronization behavior of the service produces a file scanning and/or protection scheme for all clients of the multi-client environment as long as one client includes the scanning software.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

Referring initially to the drawings, FIG. 1 illustrates a system 100 that facilitates data management in a multi-client environment. The system 100 includes a replication component 102 for replicating a file 104 among clients 106 (denoted $CLIENT_1$, $CLIENT_2$, ..., $CLIENT_N$, where N is a positive integer). For example, the file 104 can be replicated from a first client 108 to a second client 110 of the multi client environment (e.g., a peer-to-peer (P2P) topology), or from the first client 108 to N−1 clients. A protection component 112 of the system 100 facilitates scanning of the file 104 for malicious software or "malware" (e.g., a virus) prior to replication by the replication component 102 to one or more of the clients 106.

Note that as utilized herein, malicious software is intended to include all types of viruses (e.g., boot sector viruses, companion viruses, e-mail viruses, logic and time-based viruses, macro viruses, cross-site scripting viruses, batch viruses, ...), varieties of distributing malware (e.g., Trojan horses, worms, ...) and for remote access, keyloggers, and spyware, for example.

In this embodiment, the replication component 102 and the protection component 112 are shown external to the clients 106; however, in an alternative implementation, each of the clients 106 includes a replication component, and one or more of the clients 106 includes a protection component (e.g., a virus scanner application). In this alternative implementation, only one of the clients 106 needs to include the protection component 112 in order for the remaining clients to gain the benefit of file protection such as commonly associated with malware protection (e.g., virus).

The protection component 112 can activate in response to a replication action of the replication component 102, which replication action is based on data changes associated with the file system driver level (e.g., of a hard drive) or other storage driver level (e.g., volatile memory subsystem). In other words, where the first client 108 includes a directory (or other type of logical container) of a file structure on a local datastore device (not shown) in which files, documents, and/or data are persisted, any change in the directory contents automatically initiates the protection component 112 to scan the changed contents (e.g., file, document, data). The change can be detected by file comparison, for example, bit-by-bit, and metadata (e.g., timestamp, file size, file type, ...).

In another multi-client implementation, each of the clients 106 includes a file sharing space presented as part of the user interface (UI) for sharing files. A client user can then drag a file or document into the UI file sharing space to share the document with other sharing users. For example, introduction (or insertion) of the file into the file sharing space of the first client 108 results in a change in the associated file system sharing container (or directory) for the first client 108 at the file system driver layer, thereby initiating replication (e.g., manual or automatic) of the file to each member of the file sharing space such as the second client 110 (and other sharing environment clients), for example. Responsive to initiation of the replication process by the replication component 102, the protection component 112 (e.g., of the second client 110) automatically scans the file for the malicious software, and if clean, or detected and cleansed, the file is replicated to the second client 110 (and other sharing environment clients). If the user of the second client 110 changes the file, this change is then automatically detected at the file system driver layer of the second client 110, which then automatically initiates replication to the first client 108 (and other sharing environment clients). The multi-client environment of the system 100 can also be a peer-to-peer (P2P) topology.

It is to be appreciated that the file/document replication and protection processes described herein are applicable to all type of computing devices (e.g., desktop computers, portable computers, mobile devices, ...), all operating systems (e.g., Windows™ by Microsoft Corporation, Linux, Unix, MacOS™ by Apple Computing), computer processor vendors (e.g., Intel-based, AMD-based, IBM-based, ...), and so on.

Figure 2:
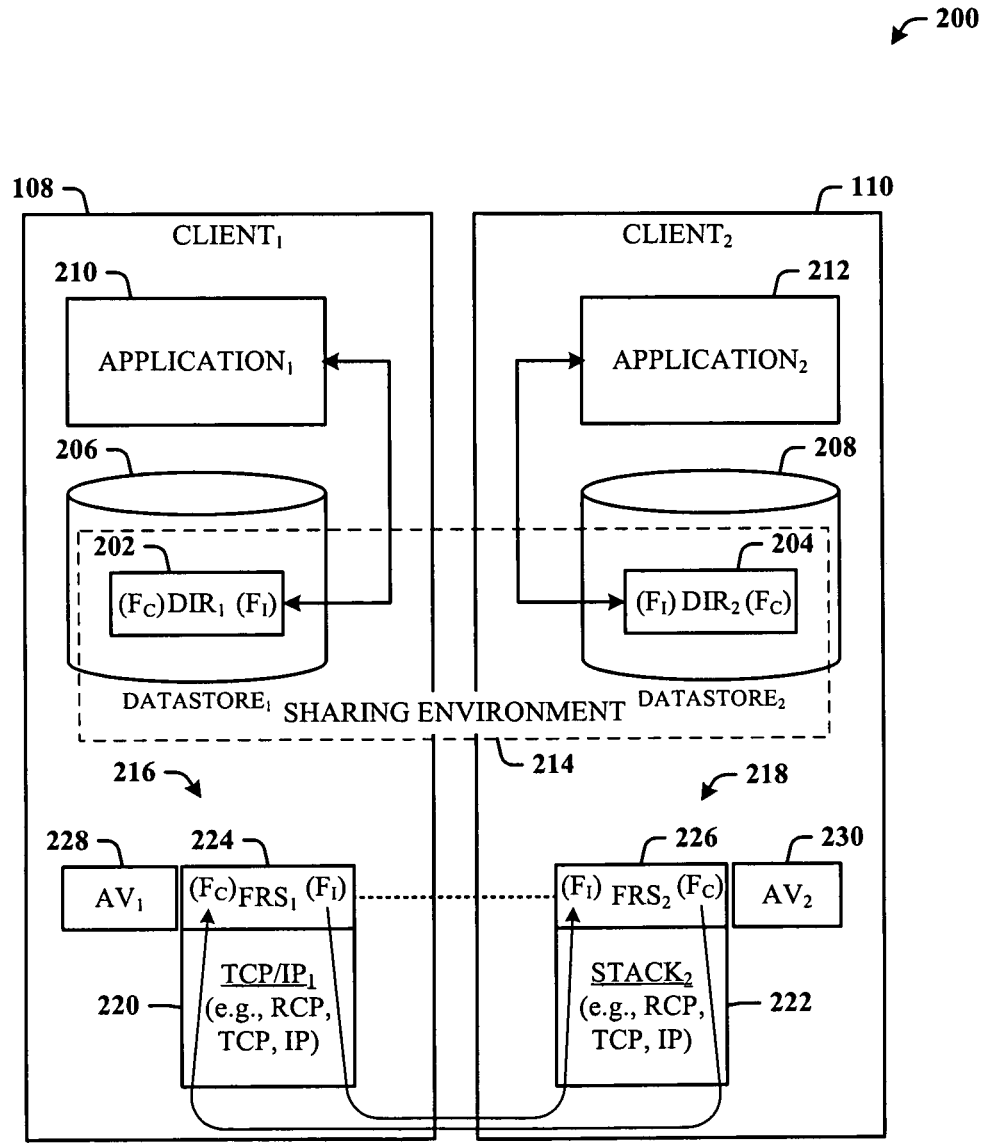
FIG. 2 illustrates an alternative system that facilitates data management in a multi-client environment in accordance with the innovation.

FIG. 2 illustrates an alternative system 200 that facilitates data management in a multi-client environment in accordance with the innovation. The system 200 illustrates a head-to-head configuration between two clients; however, it is to be understood that more clients can be included. Here, the first client 108 and second client 110 are in sharing configuration for sharing files or documents. In support of such file sharing capabilities the first client 108 has a first directory 202 created and utilized for file sharing and the second client 110 has a second directory 204 created and utilized for file sharing. The directories (202 and 204) are container types on respective first and second client datastores (206 and 208). Data activity in the directories is at the device driver layer (e.g., file system). First and second client applications (210 and 212) provide access to the corresponding first and second client directories (202 and 204), which directories (202 and 204) are included as part of a sharing environment 214 of at least the first and second clients (108 and 110) (and other clients, not shown). Accordingly, a document inserted (e.g., dragged via a UI) into the first client directory 202 will be replicated to the second client directory 204. Similarly, a document inserted (e.g., dragged via a UI) into the second client directory 204 will be replicated to the first client directory 202.

The clients (108 and 110) include respective stacks: a first client stack 216 and a second client stack 218. Each of the stacks (216 and 218) can include IP communications protocols (TCP/IP$_1$ 220 and TCP/IP$_2$ 222) (e.g., IP, TCP, RPC, etc.). Each stack (216 and 218) is associated with a corresponding file replication service (FRS) (FRS$_1$ 224 and FRS$_2$ 226) and includes respective malware detection components (AV$_1$ 228 and AV$_2$ 230). The malware detection components (228 and 230) are more in a peer relationship to the corresponding FRS (224 and 226) such that both the detection components (228 and 230) and FRS (228 and 230) monitor the file system for changes (e.g., independently of each other). The applications (210 and 212) run on top and, basically, read from and write to the corresponding directories (202 and 204). FRS is a file system level based driver that monitors the persisted data in the data stores (206 and 208) and initiates distributed replication activity whenever it detects data that has been added, modified, or deleted within the directories (202 and 204) of the monitored stores (206 and 208).

Malware protection components (228 and 230) operate by similarly monitoring the directories (202 and 204) such that any time a file is added or modified—including as a result of a file replication operation using FRS (224 and 226)—the data activity touches the device layer thereby automatically initiating malware protection scanning (e.g., virus scanning) of the file. As cleaned files are written to the directory, the FRS 224 on the first client 108 detects the activity and initiates replication of the modified file to the second client 110.

If the first client 108 does not have the malware protection component 228, but the second client 110 does (e.g., malware protection component 230), an infected file (F$_I$) moved into the first client directory 202 will get automatically replicated down the first stack 216 across to the second stack 218 and up to the second client FRS layer 226 (logically the same as the second directory 204), where the malware component 230 detects a change at the device level by the presence of the infected file (F$_I$) in the second directory 204, and automatically activates the malware component 230 for scanning of the replicated infected file (F$_I$). Once cleaned, the infected file (F$_I$) on the second client 110 becomes a cleaned file (F$_C$), which cleaned file (F$_C$) is detected as a change in the second client directory 204 (and at second FRS layer 226). Detecting the change automatically initiates replication of the cleaned file (F$_C$) from the second client 110 to the first client 108 down through the second client stack 218 across and up the first client stack 216 to the first FRS layer 224 for entry into the first client directory 202 of the first client datastore device. Accordingly, only one client (108 or 110) of the sharing environment 214 needs to have a malware protection capability (228 or 230) for all clients to benefit therefrom.

As described previously, the anti-malware layer is activated by monitoring activity in the directories (202 and 204), either caused by the applications (210 and 212) or by FRS activity. In an alternative embodiment, the anti-malware components can also provide a network service driver that monitors data being sent/received through the network protocol stack (e.g., through the replication protocol used by FRS). In this embodiment, the anti-malware components can modify data traffic to clean the infected file before it is written to the directory by the FRS driver.

Figure 3:
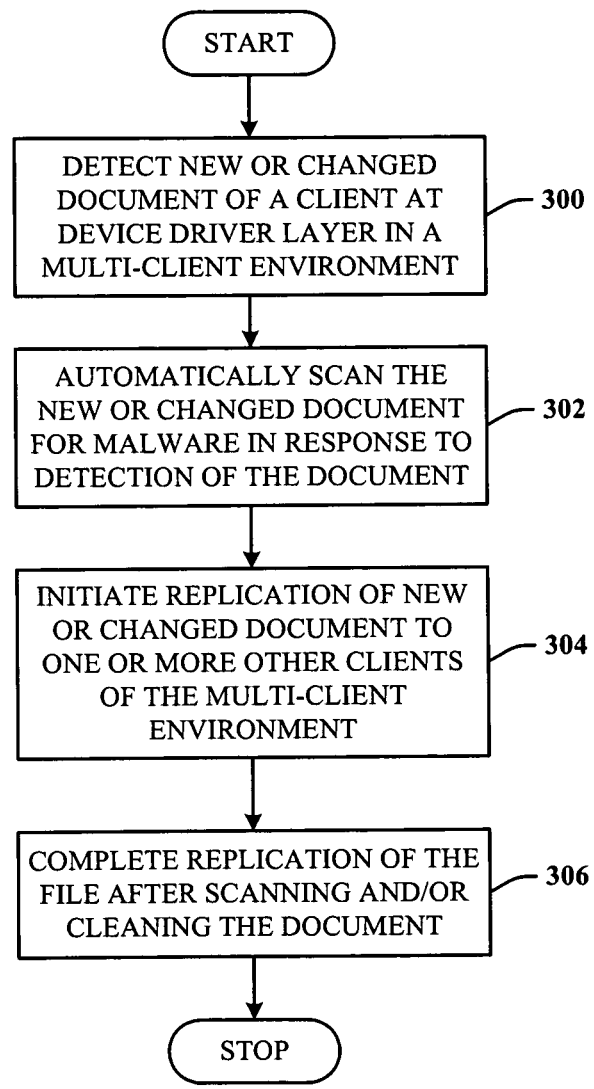
FIG. 3 illustrates a method of managing data in a peer-to-peer topology in accordance with the innovation.

FIG. 3 illustrates a method of managing data in a P2P topology in accordance with the innovation. While, for purposes of simplicity of explanation, the one or more methodologies shown herein, for example, in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

In this method, each client includes the FRS layer, but only the client that introduces the new or changed document includes a malware protection component for scanning and/or cleansing an infected document before replication to other clients of the multi-client environment (or topology). At 300, a new or changed document of a client is detected at the client device driver layer in a multi-client environment. At 302, scanning of the new or changed document is performed automatically in response to detection of the new or changed document at the device driver layer. Accordingly, the new or changed document can be cleaned to remove the malware therefrom. At 304, replication of the new or changed document is automatically initiated to one or more other clients of the multi-client environment. At 306, replication of the document is completed to the one or more other clients after the scanning (and cleaning) is completed. It should be noted that in an alternative embodiment, file replication can be initiated or performed prior to completion of the cleaning process at 302; however, in this situation, completion of the file cleaning process at 302 will re-initiate file replication as described in 304 and 306.

Figure 4:
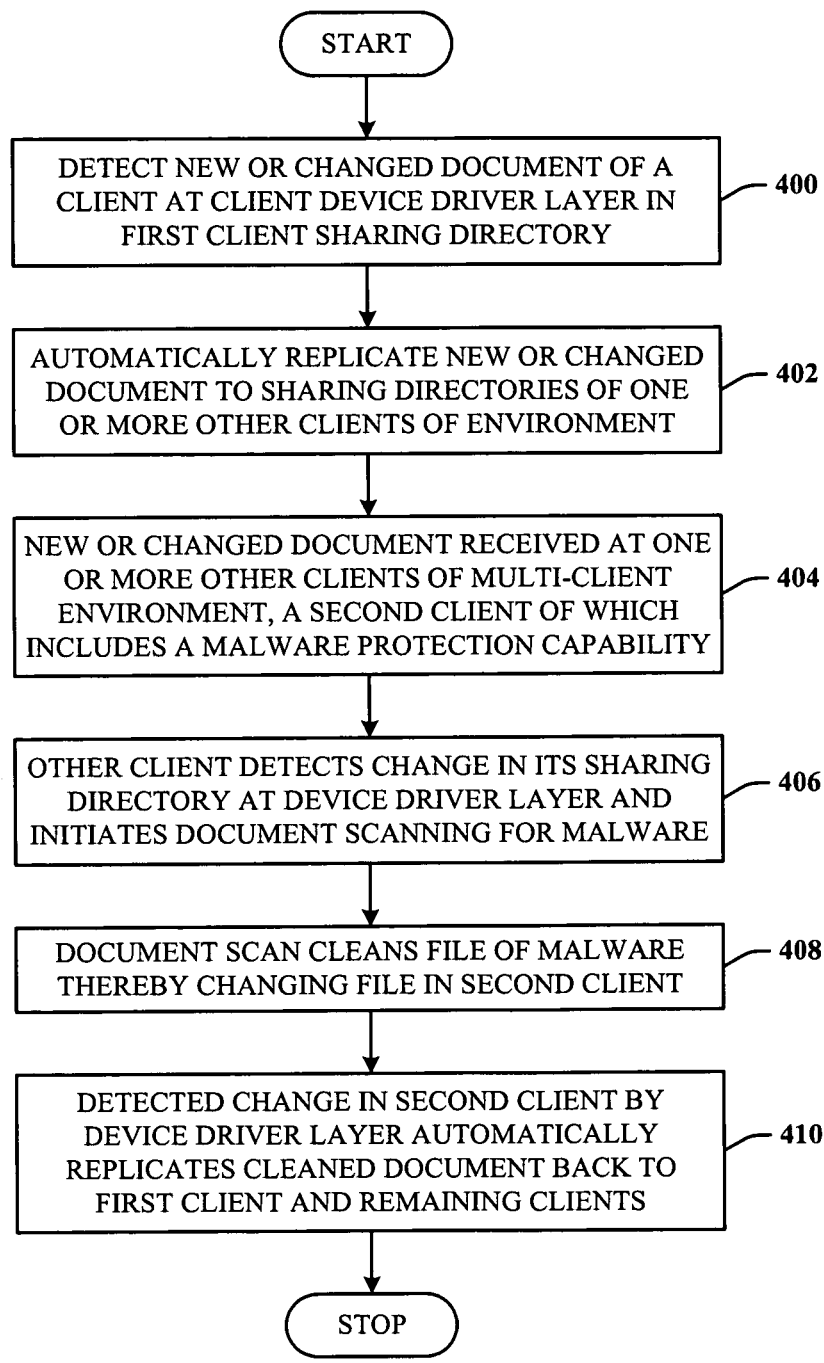
FIG. 4 illustrates an alternative method of file replication and malware scanning in accordance with the innovation.

FIG. 4 illustrates an alternative method of file replication and scanning in accordance with the innovation. In this method, each client includes the FRS layer, but the client that includes the malware protection component is not the client that introduces the new or changed document. At 400, in a multi-client sharing environment, a new or changed document of a first client is detected at the first client device driver layer when the new or changed document is moved into the first client sharing directory. The first client does not include malware protection capability. At 402, based on detection of the new or changed document in the first client sharing directory, the first client automatically initiates replication of the new or changed document to the corresponding sharing directories of one or more other clients of the environment. At 404, the new or changed document is received at the one or more other clients, a second client of which includes a malware protection capability. At 406, the second client detects a change in its sharing directory based on its device driver layer and initiates document scanning for malware. At 408, the document scan at the second client cleans the document using malware protection thereby changing the document in the second client sharing directory. At 410, the detected change in the second client sharing directory automatically replicates the cleaned document back to other clients, including the first client 108.

Figure 5:
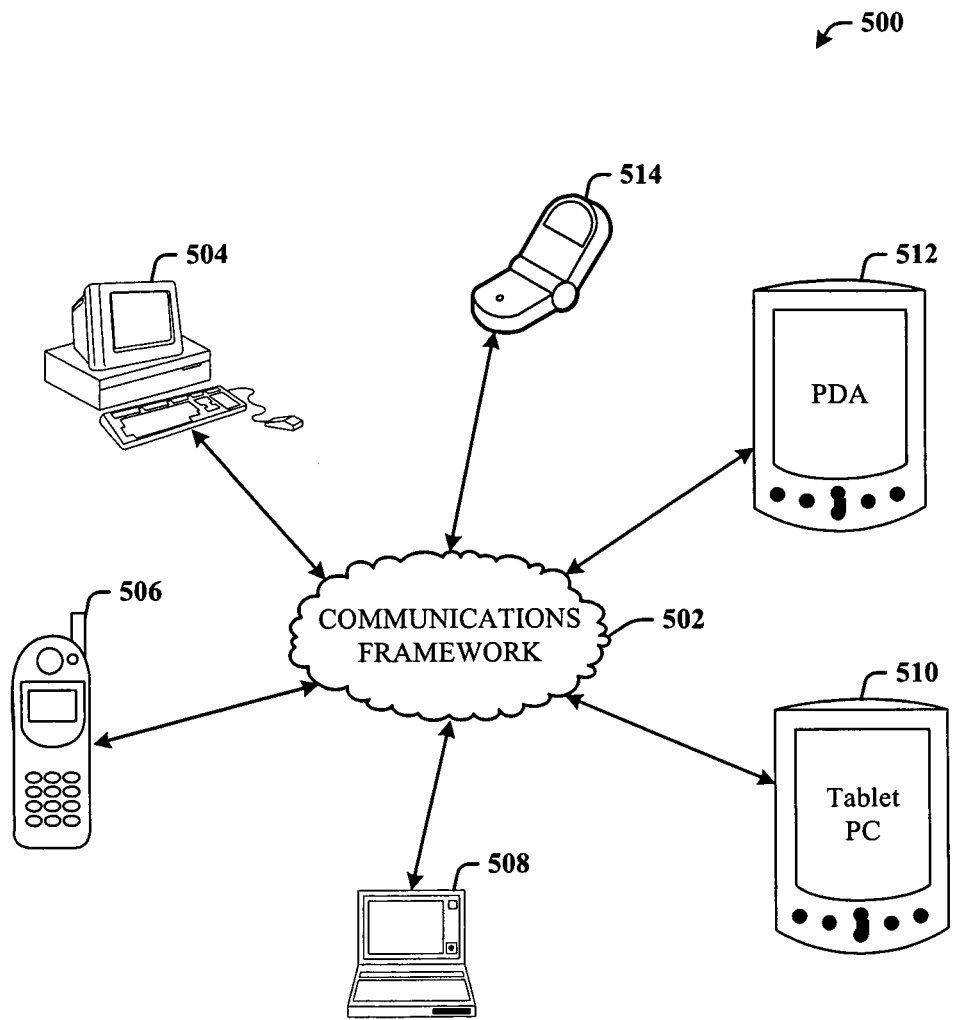
FIG. 5 illustrates a system of user devices that can benefit from the replication/malware protection architecture of the innovation.

FIG. 5 illustrates a system 500 of user devices that can benefit from the replication/malware protection architecture of the innovation. The system 500 includes a communications framework 502 via which the devices communicate. The framework 502 can facilitate P2P communications using wired and/or wireless means such as Wi-Fi, Bluetooth, Wi-Max, and so on. The framework 502 can also be a wired IP network, for example. The user devices can include a desktop computer 504, a cell phone 506, portable (or laptop) computer 508, tablet PC 510, PDA computing device 512, and/or smartphone 514. One or more of the devices (504, 506, 508, 510 and 512) can include malware protection software for scanning documents and files for malicious programs and/or content. All of the devices (504, 506, 508, 510 and 512) can include the FRS at the device driver layer for automatic replication of files and documents when are in a sharing environment. The devices (504, 506, 508, 510 and 512) can all be of the same user or different users where file replication automatically scans and cleans a shared file being replicated among the sharing clients.

While certain ways of displaying information to users are shown and described with respect to certain figures as screenshots, those skilled in the relevant art will recognize that various other alternatives can be employed. The terms "screen," "screenshot", "webpage," and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

Figure 6:
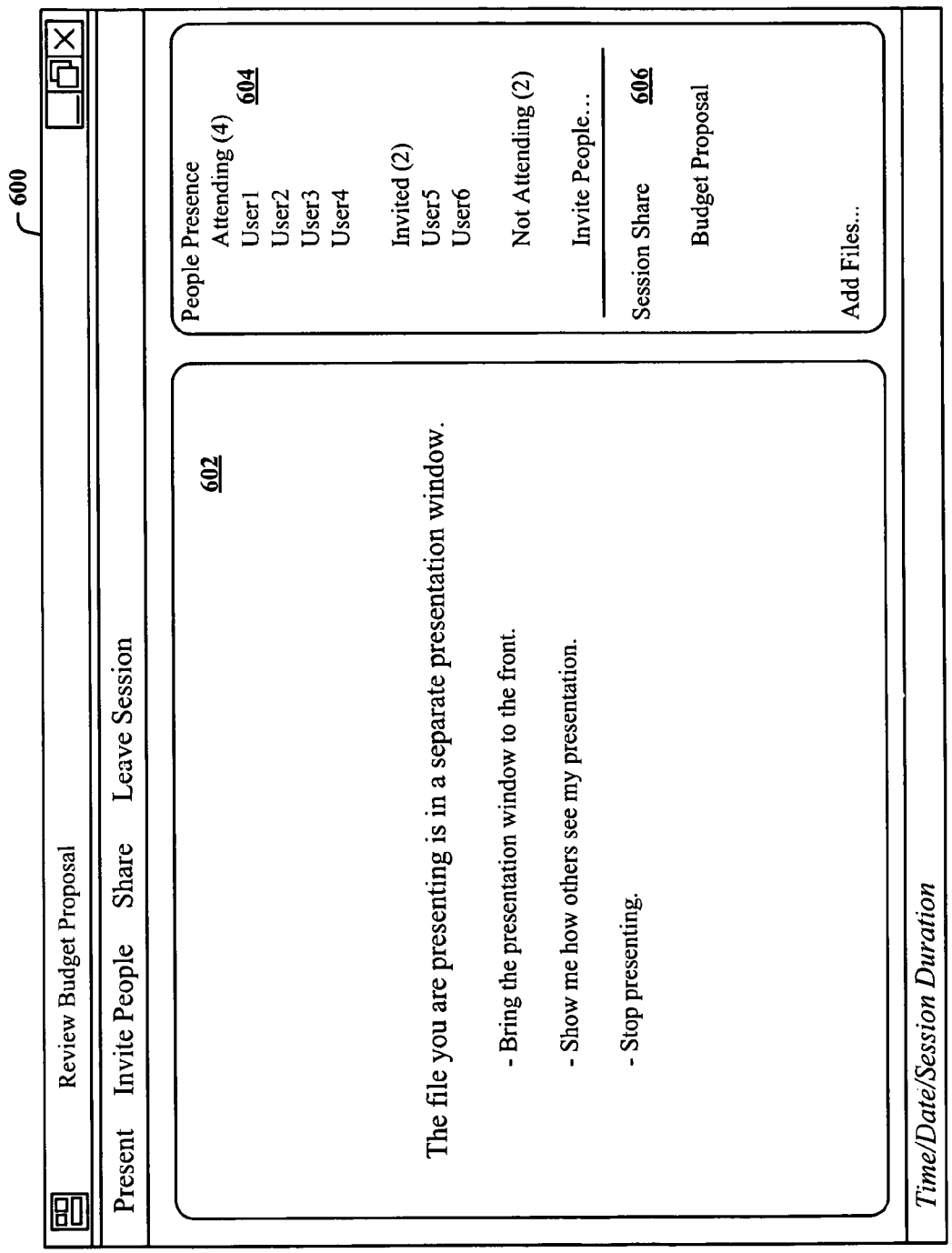
FIG. 6 illustrates a screenshot of an exemplary user interface for user interaction during a shared environment.

FIG. 6 illustrates a screenshot of an exemplary UI 600 for user interaction during a shared environment. The UI can include a central presentation control part 602 for controlling document presentation. On the right side can be a shared session part 604 that includes an invitation ledger for indicating Attending, Invited, and Not Attending users. In the lower right corner of the part 604 is a shared session area (or file sharing part) 606 into which a user can drag and drop documents/files for sharing and replication among the shared users. Additionally, the user can drag documents from the shared area 606.

Figure 7:
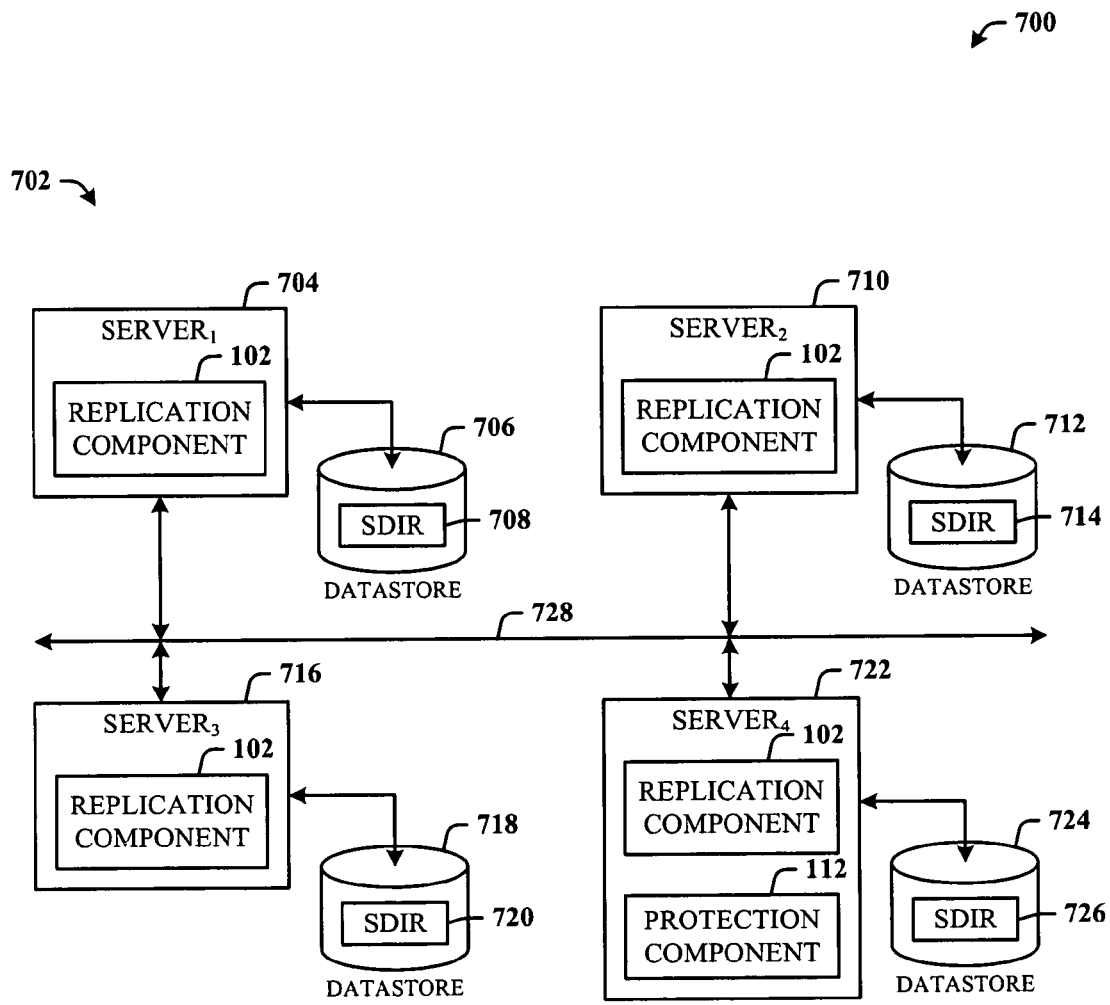
FIG. 7 illustrates application of the replication/malware protection architecture to a server farm system.

FIG. 7 illustrates application of the replication/malware protection architecture to a server farm system 700. The subject innovation finds application wherever data redundancy is desired. For example, the system 700 includes multiple servers 702 (denoted SERVER₁, SERVER₂, SERVER₃, and SERVER₄) for providing a stable and reliable always-on data access environment. Each of the servers 702 includes the replication component 102 (e.g., the file replication service) at the device driver layer for monitoring shared data across the system 700. Each of the servers 702 can also include an associated datastore (DATASTORE) on which a sharing directory (SDIR) (or other type of sharing structure) is configured for sharing data across the system 700.

Accordingly, a first server 704 includes a first datastore 706 having a configured first sharing directory 708; a second server 710 includes a second datastore 712 having a configured second sharing directory 714; a third server 716 includes a third datastore 718 having a configured third sharing directory 720; and, a fourth server 722 includes a fourth datastore 724 having a configured fourth sharing directory 726. The servers 702 are disposed on a network 726 (e.g., an enterprise network LAN, WAN, . . . ). Here, the fourth server 722 also includes the protection component 112 for scanning for malicious software in documents or files being shared among the servers 702 via the sharing directories (708, 714, 720 and 726).

In operation, a document or file placed into one of the shared directories (708, 714 or 720) gets detected and replicated, ultimately, to the fourth server sharing directory 726 where the file or document is scanned, cleansed, and re-replicated back to the other sharing directories (708, 714 and 720) of the corresponding other servers (704, 710 and 716).

One of the operations the replication component performs is to monitor a change in a file sharing directory, and update the list of documents or files in the UI accordingly and in real-time. The replication component listens for directory change events, and when there is a change in the content of the file sharing directory, an event is raised that causes updating of the corresponding information accordingly. Additionally, the replication component periodically polls the file sharing directory and compares what it finds to what it recorded earlier. If there is any discrepancy, such information is updated as well. Polling can be performed via timer message every predetermined time period (e.g., five seconds).

Because it is desirable to keep track of files already processed, the replication component maintains a list of files or documents it has encountered, in a hash map. In this map, each file name, size, last updated date/time, thumbnail handle, GUID (globally unique ID) of the matching group record, GUID of the database from the client that last modified the file, replicated version number, etc., are stored in the hash map (or table). Once a change in a file sharing directory is detected, a new hash map is created (if the file is new) or the existing hash map is updated (if the file existed before) and sent to be displayed in the list view of the UI sharing part of the UI of FIG. 6. The hash map is distributed to the sharing clients thereby supporting changes in the documents due to changes to scanned and cleaned from previously infected documents.

Figure 8:
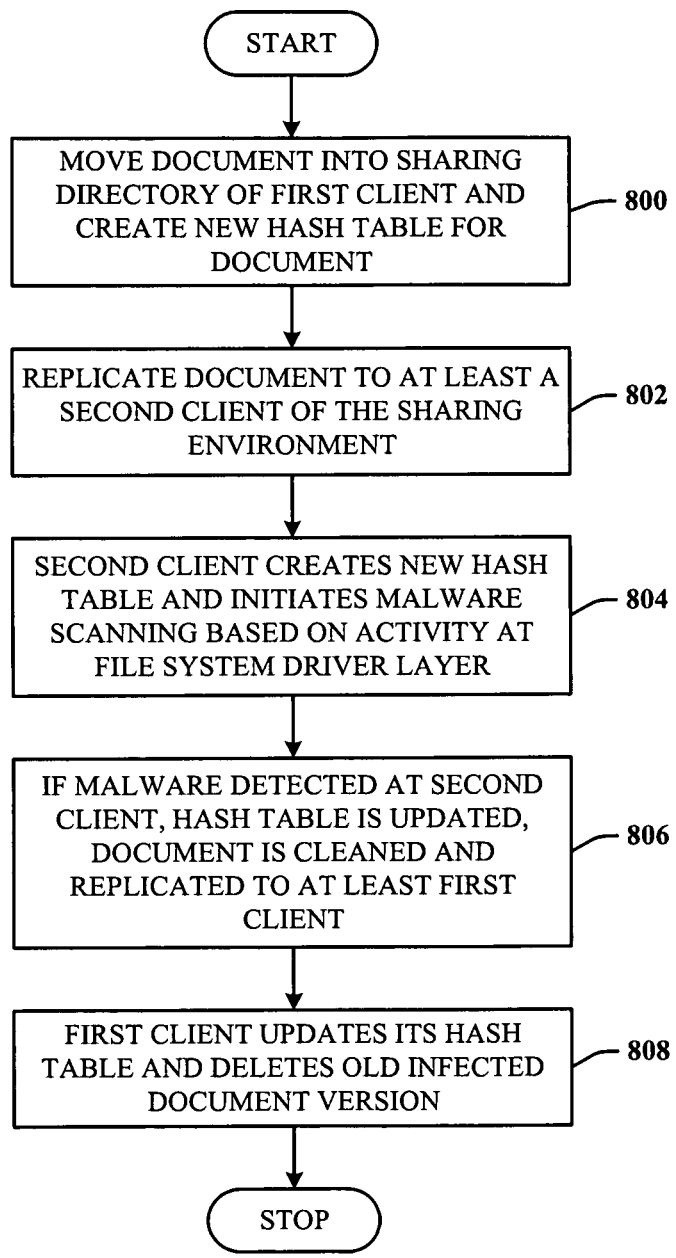
FIG. 8 illustrates a method of tracking changes in shared documents using hash tables.

FIG. 8 illustrates a method of tracking changes in shared documents using hash tables. The following method is based on the perspective of a new document being introduced into the sharing environment. At 800, a document is moved into a sharing directory of a first client and a new hash table created on the first client that tracks changes to the new document. At 802, the document is replicated to a second client sharing directory. At 804, the second client creates a new hash table to track the document changes at the second client, and initiates malware scanning of the document based on a detected activity to its sharing directory via the second client file system driver layer. At 806, if no malware is detected, no further replication is performed, and the second client hash table remains unchanged. However, if malware is detected, the document is cleaned, thereby changing the document in the sharing directory of the second client and triggering replication of the updated document to the other sharing client directories. The second client updates its hash table according to the updated document. At 808, when received at the first client sharing directory, for example, the first client updates its hash table, and deletes the old version of the document (the infected version). This process occurs similarly at the other sharing clients.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 9:
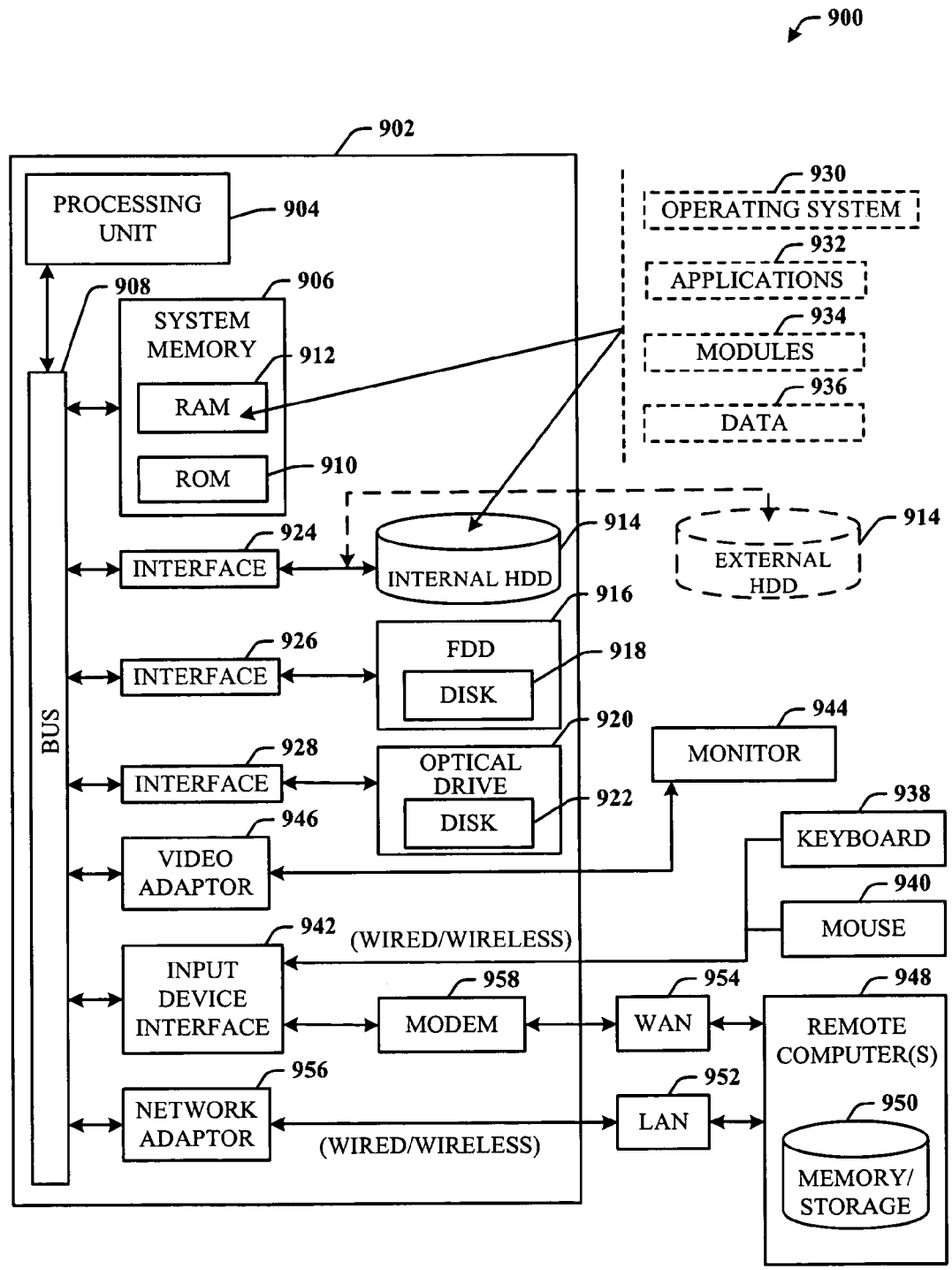
FIG. 9 illustrates a block diagram of a computing system operable to execute the disclosed replication and malware protection architecture.

Referring now to FIG. 9, there is illustrated a block diagram of a computing system 900 operable to execute the disclosed replication and malware protection architecture. In order to provide additional context for various aspects thereof, FIG. 9 and the following discussion are intended to provide a brief, general description of a suitable computing system 900 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 9, the exemplary computing system 900 for implementing various aspects includes a computer 902, the computer 902 including a processing unit 904, a system memory 906 and a system bus 908. The system bus 908 provides an interface for system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 912, including an operating system 930, one or more application programs 932, other program modules 934 and program data 936. All or portions of the operating system, applications, modules, and/or data can also be cached in the RAM 912. It is to be appreciated that the innovation can be implemented with various commercially available operating systems or combinations of operating systems. The modules 934 can include the replication component 102 and protection component 112, for example.

A user can enter commands and information into the computer 902 through one or more wired/wireless input devices, for example, a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, for example, a wide area network (WAN) 954.

Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Figure 10:
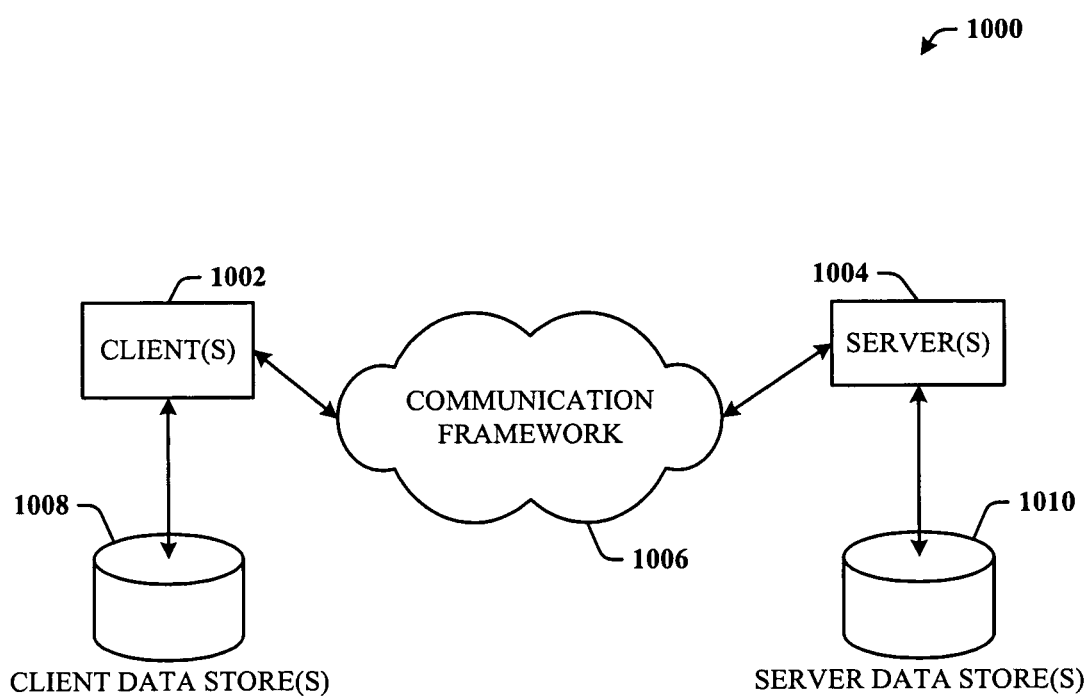
FIG. 10 illustrates a schematic block diagram of an exemplary computing environment that supports the disclosed replication and malware protection architecture.

Referring now to FIG. 10, there is illustrated a schematic block diagram of an exemplary computing environment 1000 that supports the disclosed replication and malware protection architecture. The system 1000 includes one or more client(s) 1002. The client(s) 1002 can be hardware and/or software (e.g., threads, processes, computing devices). The client(s) 1002 can house cookie(s) and/or associated contextual information by employing the subject innovation, for example.

The system 1000 also includes one or more server(s) 1004. The server(s) 1004 can also be hardware and/or software (e.g., threads, processes, computing devices). The servers 1004 can house threads to perform transformations by employing the architecture, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented data management system, comprising:
    a replication component configured to automatically replicate a file from a first client to a second client of a multi-client sharing environment;
    a protection component of one of the first or second clients configured to automatically scan the file for malicious software based on the file being new or changed at a storage driver level, wherein the protection component automatically cleans the file of the malicious software prior to replication to the second client; and
    a processor configured to execute computer-executable instructions associated with at least one of the replication component or protection component.

2. The system of claim 1, wherein the storage driver level is associated with at least one of a mass storage device or a volatile memory subsystem of one of the first or second clients.

3. The system of claim 1, wherein the file is replicated to the second client after the protection component automatically scans the file for the malicious software.

4. The system of claim 1, wherein the file sharing space is presented as part of a user interface (UI) for sharing files each of the clients.

5. The system of claim 1, wherein the multi-client environment includes a file sharing space for sharing files.

6. The system of claim 5, wherein clients of the multi-client environment include the file sharing space, and introduction of the file into a file sharing space of the first client initiates replication of the file to the second client, where the protection component of the second client automatically scans the file for the malicious software after replication to the second client, and replicates the scanned file back to the other clients.

7. The system of claim 5, wherein clients of the multi-client environment include the file sharing space, and introduction of the file into a file sharing space of the first client automatically initiates replication of the file to the second client, where the protection component of the first client automatically scans the file for the malicious software prior to replication to the second client.

8. The system of claim 1, wherein the multi-client environment is one of a peer-to-peer (P2P) topology, server-to-server configuration, or client/server configuration.

9. The system of claim 1, wherein the protection component automatically scans the file in response to the replication component initiating replication of the file.

10. A computer-implemented method of managing data, comprising acts of:
    detecting a new or changed document of a client at a device driver layer in a shared environment;
    initiating replication of the new or changed document to one or more other clients of the shared environment;

automatically scanning the new or changed document for malicious software in response to a replication action;

replicating the new or changed document to the one or more other clients after the act of automatically scanning; and utilizing a processor to execute instructions stored in memory to perform at least one of the acts of detecting, initiating, scanning, or replicating.

11. The method of claim 10, wherein the new or changed document is an update of a previous document of the shared environment.

12. The method of claim 10, wherein the act of automatically scanning occurs at a driver level of the client.

13. The method of claim 10, wherein the malicious software is a virus associated with the new or changed document.

14. The method of claim 10, wherein the act of replicating the new or changed document to the one or more other clients occurs after the act of automatically scanning such that the act of automatically scanning is performed at the client.

15. The method of claim 10, wherein the act of replicating the new or changed document to the one or more other clients occurs before the act of automatically scanning such that the act of automatically scanning is performed at the one or more of the other clients.

16. The method of claim 10, wherein the device driver layer is associated with a persisted storage subsystem.

17. The method of claim 10, further comprising creating and maintaining a hash table for tracking document activity in a sharing directory.

18. A computer-implemented data management system, comprising:

at least one computer configured to:

detect an infected file in a first sharing directory of a first sharing client at a device driver layer;

replicate the infected file to a second sharing directory of a second sharing client;

detect presence of the infected file in the second sharing directory of a second sharing client;

automatically clean the infected file for malicious software at the second client, the infected file cleaned into a cleansed file; and replicate the cleansed file to the first sharing directory of the first client.

19. The system of claim 18, further comprising at least one computer configured to update a hash table according to changes to the infected file.

20. The system of claim 18, further comprising at least one computer configured to replicate with the device driver layer.

\* \* \* \* \*